(12) United States Patent
Haye et al.

(10) Patent No.: US 8,352,448 B2
(45) Date of Patent: Jan. 8, 2013

(54) SECURELY DELETING DATA IN A TRANSACTIONALLY CONSISTENT MANNER

(75) Inventors: Mark A. Haye, Tucson, AZ (US); Matthew J. Anglin, Tucson, AZ (US); David M. Cannon, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 62 days.

(21) Appl. No.: 11/626,126

(22) Filed: Jan. 23, 2007

(65) Prior Publication Data

US 2008/0177802 A1 Jul. 24, 2008

(51) Int. Cl.
*G06F 17/00* (2006.01)

(52) U.S. Cl. .......................... 707/703; 707/684; 707/704

(58) Field of Classification Search .............. 707/8, 200, 707/202, 205, 206, 679, 780, 781, 782, 691, 707/607, 682, 684, 703, 704, 826; 358/1.16
See application file for complete search history.

(56) References Cited

U.S. PATENT DOCUMENTS

| | | | |
|---|---|---|---|
| 5,265,159 A | | 11/1993 | Kung |
| 5,291,594 A | * | 3/1994 | Sekiguchi et al. ............ 707/201 |
| 5,488,720 A | | 1/1996 | Inui |
| 5,561,795 A | | 10/1996 | Sarkar |
| 5,740,349 A | * | 4/1998 | Hasbun et al. ...................... 714/8 |
| 6,304,948 B1 | | 10/2001 | Motoyama et al. |
| 6,314,437 B1 | | 11/2001 | Starek et al. |
| 6,567,928 B1 | * | 5/2003 | Lyle et al. ........................ 714/15 |
| 6,571,259 B1 | * | 5/2003 | Zheng et al. ................... 707/205 |
| 6,944,635 B2 | | 9/2005 | Kim et al. |
| 7,389,514 B2 | * | 6/2008 | Russell et al. ................. 719/315 |
| 2004/0068501 A1 | * | 4/2004 | McGoveran ...................... 707/8 |
| 2004/0193945 A1 | * | 9/2004 | Eguchi et al. ..................... 714/6 |
| 2005/0138085 A1 | | 6/2005 | Verma et al. |
| 2005/0144199 A2 | * | 6/2005 | Hayden ......................... 707/204 |
| 2006/0143238 A1 | * | 6/2006 | Tamatsu ....................... 707/200 |

FOREIGN PATENT DOCUMENTS

| | | |
|---|---|---|
| EP | 0336548 | 10/1989 |
| WO | WO01/48638 | 7/2001 |

OTHER PUBLICATIONS

Dey et al., "Method for Dropping Data Sets. Apr. 1983.", Apr. 1983, IBM TDB Apr. 1983 p. 5453-5455.
Fukuda et al. "Method to Ensure the Integrity of File Operations in a Database Transaction", Jul. 1995, IBM TDB v38 n7 p. 475-478.
PCT/EP2008/050321 International Search Report and Written Opinion.

* cited by examiner

*Primary Examiner* — Greta Robinson
*Assistant Examiner* — Md. I Uddin
(74) *Attorney, Agent, or Firm* — Cantor Colburn LLP; Feb Cabrasawan (57) ABSTRACT

A process is disclosed by which data is securely deleted in a transactionally consistent manner. This may be accomplished by committing a preparation transaction for a data object within a system managing the data object in order to return the system to an initial condition if necessary, attempting to commit an execution transaction with the data object only after committing the preparation transaction, and securely deleting any portion of the data object necessary to return the system to the initial condition if committing the execution transaction fails and to change the system to a completed condition only if committing the execution transaction succeeds. In a delete or move transaction an existing backup object may be assigned a new logically deleted state such that if the delete or move transaction fails, the data will be made accessible again.

12 Claims, 10 Drawing Sheets

SECURELY DELETING DATA IN A TRANSACTIONALLY CONSISTENT MANNER

BACKGROUND OF THE INVENTION

1. Field of the Invention

This invention relates to data backup and restore systems in a computer system. Particularly, this invention relates to handling data securely in data backup and restore systems operating on networked computer systems.

2. Description of the Related Art

A typical data backup and restore system, such as the IBM's Tivoli Storage Manager (TSM) can provide client-server-based backup and recovery for client objects (e.g. files). The system stores object data in a storage repository and maintains metadata related to each object in a database. The storage of the data and metadata relies on a transactional system in order to ensure referential integrity of the database.

As backup objects are manipulated by such a system, data is written, deleted, and/or moved (which is essentially a combination of writing and deleting). These data operations occur to process the backup objects into, out of and within a backup repository that is managed by the backup system. In a conventional backup system, it is sufficient to only "logically" delete data such that only the references to physical storage locations of the data of the backup objects are erased from the system (file system and/or backup system). This ordinary deletion process means that the data may be recoverable up until the moment that new data is written over the identical location. This can be a desirable byproduct in many cases, but it is undesirable when data security is important.

Recently, increased concern with data security has led to the additional requirement that data be securely deleted (i.e., destroyed) when it is deleted (or moved, which constitutes copying the data to a new storage location and deleting from the original location). The typical life cycle for a backup object begins when the object is first inserted into the backup server. Over time, the backup object might subsequently be moved to one or more new storage locations within the backup repository and may reside in the repository for a user-specified retention period until it is finally deleted as scheduled. Another case for deletion is when the initial insertion of the object into the backup server fails. In this case, any partially-written data must also be deleted. In all cases of deletion, any sensitive data must be securely deleted. Unlike logical deletion which minimally only erases references to the actual data location, a secure deletion process also actively obliterates the data where it physically exists in the storage device. Some prior art systems and methods have been developed in the areas of transactional processing in backup systems and secure deletion.

U.S. Pat. No. 6,944,635 by Kim et al., issued Sep. 13, 2005, describes a method for file deletion and recovery against system failures in a database management system comprising steps of deleting files listed in a pending action list during a transaction commit process, writing a non-atomic file deletion as an atomic operation into a log and recovering uncompleted file deletion during restart recovery by using the log. When system failures occur during file deletion in a database management system, resources of which releasing is interrupted by failures are released perfectly through recovery step, so it is advantageous in that coherency of data is maintained and efficiency of storage device arises.

U.S. Pat. No. 5,561,795 by Sarkar, issued Oct. 1, 1996, describes a transaction processing system where audit information for database updates and the status of transactions in process is sequentially written in audit records in an audit file, where the audit file may be used to restore the database to a consistent state following a system failure. The invention decreases the overhead processing required for auditing, and at the same time minimizes the impact the auditing has on the processing time required for restoring the database. A value which references the location in the audit file at which recovery of the database may begin is conditionally updated each time a page of the database which is cached in the main memory of the data processing system is written to non-volatile storage, based upon the position of the earliest written audit record which is associated with the cached page. In addition, when processing of a transaction is complete, the transaction identifier of the oldest incomplete transaction is saved in the audit record for the completed transaction. When restoring the database to a consistent state, the value which is maintained according to the earliest written audit record and the transaction identifier of the oldest incomplete transaction are used as reference points in the audit file to minimize the processing required to restore the database.

U.S. Patent Application Publication No. 2005/0138085 by Verma et al., published Jun. 23, 2005, describes a transactional file system wherein multiple file system operations may be performed as part of a user-level transaction. An application specifies that the operations on a file, or the file system operations of a thread, should be handled as part of a transaction, and the application is given a file handle associated with a transaction context. For file system requests associated with a transaction context, a component within the file system manages the operations consistent with transactional behavior. The component, which may be a resource manager for distributed transactions, provides data isolation by providing multiple versions of a file by tracking copies of pages that have changed, such that transactional readers do not receive changes to a file made by transactional writers, until the transactional writer commits the transaction and the reader reopens the file. The component also handles namespace logging operations in a multiple-level log that facilitates logging and recovery. Page data is also logged separate from the main log, with a unique signature that enables the log to determine whether a page was fully flushed to disk prior to a system crash. Namespace isolation is provided until a transaction commits via isolation directories, whereby until committed, a transaction sees the effects of its own operations not the operations of other transactions. Transactions over a network are also facilitated via a redirector protocol.

U.S. Pat. No. 6,304,948 by Motoyama et al., issued Oct. 16, 2001, describes an approach for storing and maintaining data involving determining whether data has been stored on a first non-volatile storage for a specified period of time. If so, then the data on the first non-volatile storage is deleted by overwriting the data on the first non-volatile storage with a predetermined value so that the data cannot be recovered. The first non-volatile storage is registered with a registration authority to provide authentication of the data maintained on the first non-volatile storage. A duplicate copy of the data is stored on a second non-volatile storage and if a determination is made that the data has been stored on a first non-volatile storage for a specified period of time, then the duplicate copy of the data is deleted by overwriting the duplicate copy of the data on the second non-volatile storage with the predetermined value.

U.S. Pat. No. 5,265,159 by Kung, issued Nov. 23, 1993, describes a method of securely deleting a file on a storage medium of a computer system so that it is not readable, wherein an encryption algorithm is used to encrypt the data in the stored file prior to a conventional deletion process. The invention permits a user to erase files from a permanent storage space and in a manner that makes the file totally unreadable by others. When a user requests deletion of a stored file, the file is encrypted so that it is not readable. The user has an option to undelete the file by decrypting the file as long as this operation is done before the storage space is used by another program. When the secure deletion method is used, no utility program can recover any information from the deleted file. To an intruder, the storage space is encrypted to look like random bits. Therefore, no information can be retrieved nor derived from the encrypted, deleted file. If the user does not expect to undelete the information, a one-way encryption algorithm is used to increase the speed of secure deletion of the file. If the user does not destroy the key, he or she may recover the file. This method restores the file directory pointer to the file, and decrypts the encrypted stored file using the random key to permit access to the data contained in the stored file.

U.S. Pat. No. 6,314,437 by Starek et al., issued Nov. 6, 2001, describes a method and apparatus that enhance file system calls to a file system structure of an operating system. In particular, file system calls can be enhanced to provide real-time secure file deletion on an ongoing basis. A file system call that is intended to perform a function with respect to data stored on a storage device is intercepted. It is then determined whether the file system call is of a type that should be processed. If not, the original file system call is passed on through the file system. If the file system call should be processed, supplemental processing is performed to enhance the original file system call and the file system call is transparently returned to the calling system application. In embodiment, real-time secure file deletion is implemented using a vendor supplied driver (VSD) executing within the installable file system (IFS) of WINDOWS 95. Further, a method and system are disclosed for real-time secure data deletion in a system having an NTFS file system. Read calls are monitored using a read filter and pointers to NTFS metafiles and page files are recognized and stored. Write calls are monitored using a write filter and real-time secure data deletion of buffers is performed. File creation operations are monitored and real-time secure data deletion of user files is performed when the file is to be overwritten. Further, set information operations are monitored and real-time secure data deletion is performed for truncated, shrunk or deleted user files.

U.S. Pat. No. 5,488,720 by Inui, issued Jan. 30, 1996, describes an improved small electronic apparatus such as an electronic organizer. In the apparatus, data to be kept stored is prevented from being erroneously deleted. This apparatus comprises: a memory, a plurality of input keys; a temporary deletion element for, when a first predetermined key operation is performed, setting desired data which is stored in the memory into a temporary deletion state; a deletion element for, when a second predetermined key operation is performed, deleting the data which has been set into the temporary deletion state from the memory; and a release element for, when a third predetermined key operation is performed, releasing the temporary deletion state of the data which has been set into the temporary deletion state.

There is a need for systems and methods for securely deleting data applied in a data backup system. A conventional approach to this problem would be to securely delete the backup data in the same transaction that is performing the delete or move transaction. However, this introduces the additional problem of undoing the changes if the transaction fails. Under the conventional approach, the only way to be able to undo the destruction of the data would be to copy the original data into the transaction log or some other safe location, so that it could be retrieved in the event that the transaction fails. However, this solution is impractical in many situations because the amount of data could easily overwhelm the log and may actually further compromise security by creating yet another copy of the data that must also be securely deleted.

In view of the foregoing, there is a need in the art for systems and methods for securely destroying data applied in a backup system. There is a need for such systems and methods to operate without allowing sensitive data to become accessible notwithstanding any type of failure occurring in the operation of the backup system. Particularly, there is a need for such systems and methods to operate without making additional copies of the original data. The need for techniques which facilitate secure deletion of data objects is more pronounced in the operation of file or backup systems operating over distributed computer networks where a file transaction can fail if any of large number of devices fails. These and other needs are met by the present invention as detailed hereafter.

SUMMARY OF THE INVENTION

Embodiments of the invention can provide a process by which data is securely destroyed in a transactionally consistent manner, without requiring that all the data of the backup object be copied to the log. This may be accomplished by assigning the object to a new logically deleted state in which it is inaccessible (cannot be restored or retrieved by the end user) and pending secure destruction. The change of state is performed in the delete or move transaction, such that if the transaction commits, the object is logically deleted. If the transaction fails, the data will still be accessible.

A typical embodiment of the invention comprises a computer program embodied on a computer readable medium including program instructions for committing a preparation transaction for a data object within a system managing the data object in order to return the system to an initial condition if necessary, program instructions for committing an execution transaction with the data object only after committing the preparation transaction, and program instructions for securely deleting any portion of the data object necessary to return the system to the initial condition if committing the execution transaction fails and to change the system to a completed condition only if committing the execution transaction succeeds. Typically, no portion of the data object is written by the preparation transaction in order to further reduce any security risk during operation of an embodiment of the invention.

In some embodiments, the system condition may be managed with the preparation transaction and the execution transaction committed to a database comprising one or more records associated with the data object including one or more storage locations for the data object. Further, the one or more records associated with the data object may include a state for the data object. There are three exemplary operating cases for an embodiment of the invention, inserting a data object in the system, deleting a data object from the system and moving a data object within the system.

In the case of inserting a data object in the system, the preparation transaction comprises allocating a storage location for the data object and the execution transaction comprises writing the data object into the storage location to insert the data object into the system. In this case, returning the system to the initial condition comprises securely deleting any portion of the data object written to the storage location if the execution transaction fails, whereas changing the system to a completed condition comprises successfully writing the data object to the storage location in the execution transaction.

In the case of deleting a data object from the system, the preparation transaction comprises assigning a logically deleted state to the data object existing at a storage location in the system and the execution transaction comprises deleting the data object in the system. Here, returning the system to the initial condition comprises removing the logically deleted state from the data object at the storage location to make the data object accessible if the execution transaction fails, whereas changing the system to a completed condition comprises successfully securely deleting the data object at the storage location.

Finally, the case of moving a data object within the system is essentially a combination of inserting and deleting the same data object to two different storage locations. The preparation transaction comprises assigning a logically deleted state to the data object existing at a first storage location in the system and allocating a second storage location in the system for the data object. The execution transaction comprises copying the data object from the first storage location to the second storage location and updating the database to reference the data object at the second location. In this case, returning the system to the initial condition if the execution transaction fails comprises removing the logically deleted state from the data object at the first storage location to make the data object accessible and securely deleting any portion of the data object written to the second storage location. Changing the system to a completed condition comprises successfully writing the data object to the second storage location in the execution transaction followed by successfully securely deleting the data object at the first storage location.

Similarly, a typical method embodiment of the invention comprises the steps of committing a preparation transaction for a data object within a system managing the data object in order to return the system to an initial condition if necessary, attempting to commit an execution transaction with the data object only after committing the preparation transaction, and securely deleting at least a portion of the data object. Securely deleting is performed either to return the system to the initial condition if committing the execution transaction fails or to change the system to a completed condition only if committing the execution transaction succeeds. The method may be further modified consistent with the program and system embodiments of the invention described herein.

In addition, a typical system embodiment of the invention may include a data storage for storing a data object from a client and a system manager managing storage of the data object from the client. The system manager commits a preparation transaction for the data object in order to return the system to an initial condition if necessary, attempts to commit an execution transaction with the data object only after committing the preparation transaction, and securely deletes at least a portion of the data object. Here also, securely deleting is performed either to return the system to the initial condition if committing the execution transaction fails or to change the system to a completed condition only if committing the execution transaction succeeds. The system may be further modified consistent with program and method embodiments of the invention described herein.

In further embodiments, the system may comprise a data backup system and the data object comprises a backup object stored in a backup repository. Furthermore, the system may operate over a distributed computer system of networked devices. In one exemplary embodiment, the system comprises a distributed data backup system operating over a distributed computer system of networked devices and the data object comprises a backup object stored in a backup repository of the distributed data backup system.

BRIEF DESCRIPTION OF THE DRAWINGS

Referring now to the drawings in which like reference numbers represent corresponding parts throughout.

DETAILED DESCRIPTION OF THE PREFERRED EMBODIMENT

1. Overview

Embodiments of the invention address the problem of secure deletion by deferring the destruction of the object data to a later time such that failure of the delete or move transaction will result in no loss of data and require no additional copies of the data. It should be noted that although embodiments of the invention are described herein primarily with respect to a backup system for managing data backup for one or more users (and particularly, one operating on a network based computer system), embodiments of the invention are generally applicable to any file handling system as will be understood by those skilled in the art. In addition, it is also important to note that embodiments of the present invention are not limited to any particular secure deletion process, but may employ any type of secure deletion process that positively removes data from a specified physical location such that it is not recoverable by known means. For example, secure deletion may involve overwriting the storage location with a random or otherwise specified pattern of bits to further hinder reading of data from storage locations which might otherwise be discerned by a scan of the media (e.g. with specialized hardware) if the location had only been overwritten with zeros. Embodiments of the invention can handle at least three basic deletion cases. In one case, the initial storing of the object fails. In another case, the object is deleted at the normal end of its life cycle. Finally in a third case, the data is moved to a new location resulting in deletion from the original location.

When a data object is being inserted into the backup server, an execution transaction (i.e. an insert transaction) may be used to create database entries that describe the data object (e.g., the object name, attributes, retention period, etc.). A separate preparation transaction is also used to create database entries that describe the storage space into which the object data will be written. The separate preparation transaction is committed to the database before any data is written to the storage location. These database entries put the object's space in the state of being written. If the write fails, the committed space is removed from the being written state and put into the state of logically deleted and pending secure destruction. Only if the write succeeds, the committed space is removed from the being written state and put into the state of accessible and not pending secure deletion, which is done as part of committing the execution transaction. If the backup server ends abnormally during an insert operation (as the result of a power failure, for example), upon restart any committed space in the being written state is put into the state of logically deleted and pending secure destruction.

In time, the data object may be moved to a new storage location and eventually the retention period of the data object expires such that it will be deleted. Treatment of either a deletion or a move execution transaction may be handled similarly; a move is essentially a deletion with an additional insertion combined. The move/delete preparation transaction removes database entries that allow the data object to be retrieved (in the case of a move the data object would be retrievable only from the new location), and creates entries to place the data object in a logically deleted state in which it is pending secure deletion, but the storage location that contains the data object is not modified in any way yet. If the move/delete execution transaction succeeds, then the data object remains inaccessible and is pending secure deletion. If the move/delete execution transaction fails, the changes made in the preparation transaction will be undone such that the data object is still intact and accessible and is not pending secure destruction. Furthermore, if the operation was a move operation, the data written during the move, before the execution transaction ultimately failed, will need to be marked for secure deletion in a manner quite similar to an initial store of data into the pool. For example, if a backup server moves 40 MB of a 100 MB object and then encounters an error, the 40 MB which was copied/moved needs to be securely deleted when the entire move operation fails.

Under either deletion scenario, an asynchronous process may be used to find data objects in the logically deleted state that are pending secure deletion, then securely delete them, and remove all remaining database entries that describe the storage location, thus making the storage location available for use by other operations.

Figure 1:
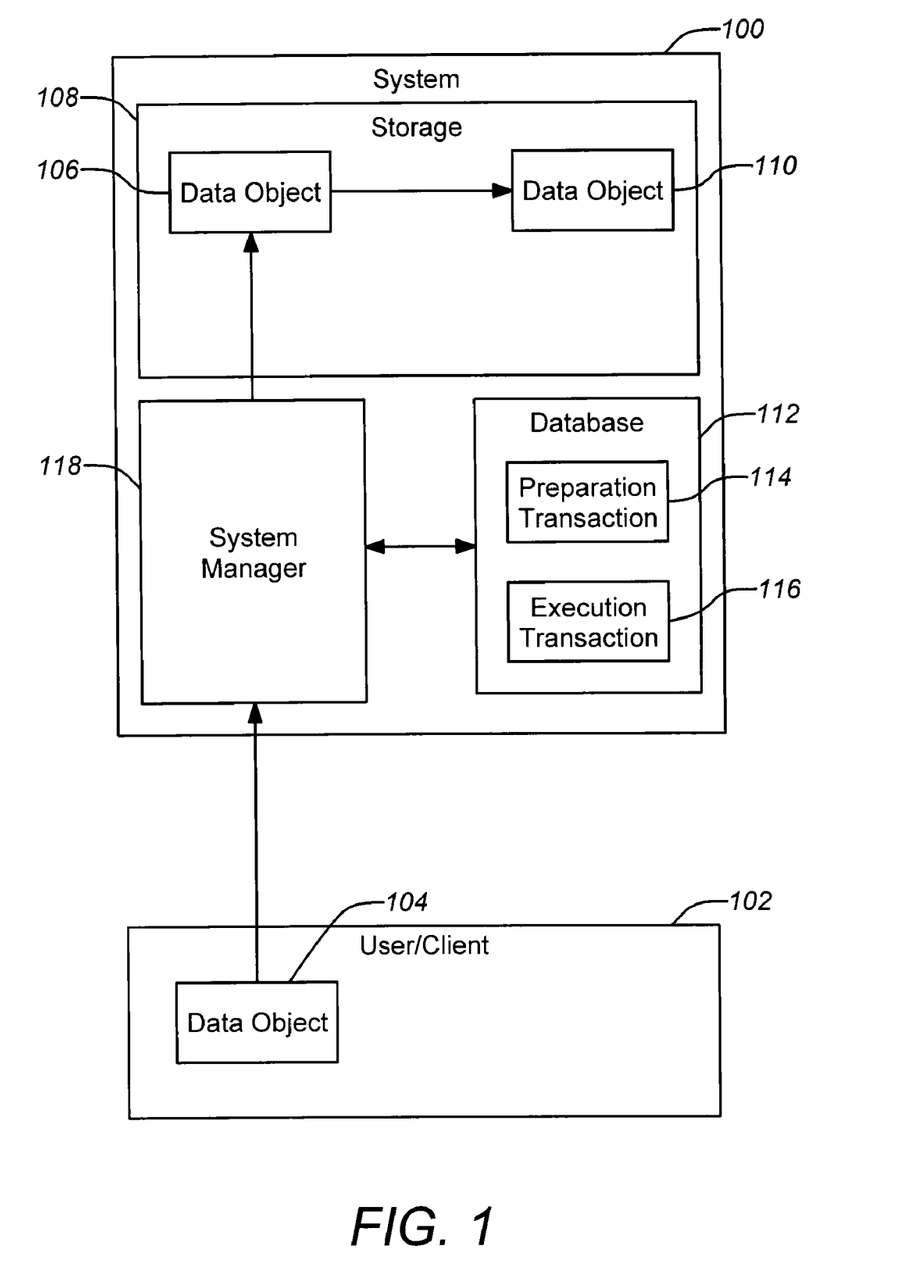
FIG. 1 is a functional block diagram of an exemplary embodiment of the present invention for securely deleting data in a transactionally consistent manner.

FIG. 1 is a functional block diagram of an exemplary embodiment of the present invention for securely deleting data in a transactionally consistent manner. The system 100 operates to store and manage data objects for one or more users 102, such as in a data backup system. A data object 104 may be inserted into the system 100 from a user 102. Thus, a data object 106 representing a copy of the data object 104 is written into storage 108 (e.g., a backup repository) of the system 100. A data object 106 may be deleted, e.g., at the expiration of a specified period as is typical in a backup system. In addition, a data object 106 in the system 100 may be moved to another location within the storage 108, which is equivalent to writing an equivalent data object 110 at another location within the storage 108 and deleting the original data object 106. Manipulation of the data objects within the system 100 may be controlled by a system manager 118 (which may comprise one or more components). To facilitate operations on the data objects in the storage 108, a database 112 may be employed to maintain information on the properties and transactions (e.g. storage location, expiration, state, logical delete, secure delete, write, etc.) of the data objects in the storage 108. As will be further described hereafter, to ensure data security in orderly manipulations of the data objects within the system 100, for a given data object 106, the database 112 may store a preparation transaction 114 to be committed before a stored execution transaction 116 is committed. The preparation transaction 114 allows the system 100 (the data object 106) to be returned to an initial state if the execution transaction 116 should fail to commit. In the next section, an exemplary hardware environment for supporting operation of the system 100 will be detailed.

2. Hardware Environment

Figure 2A:
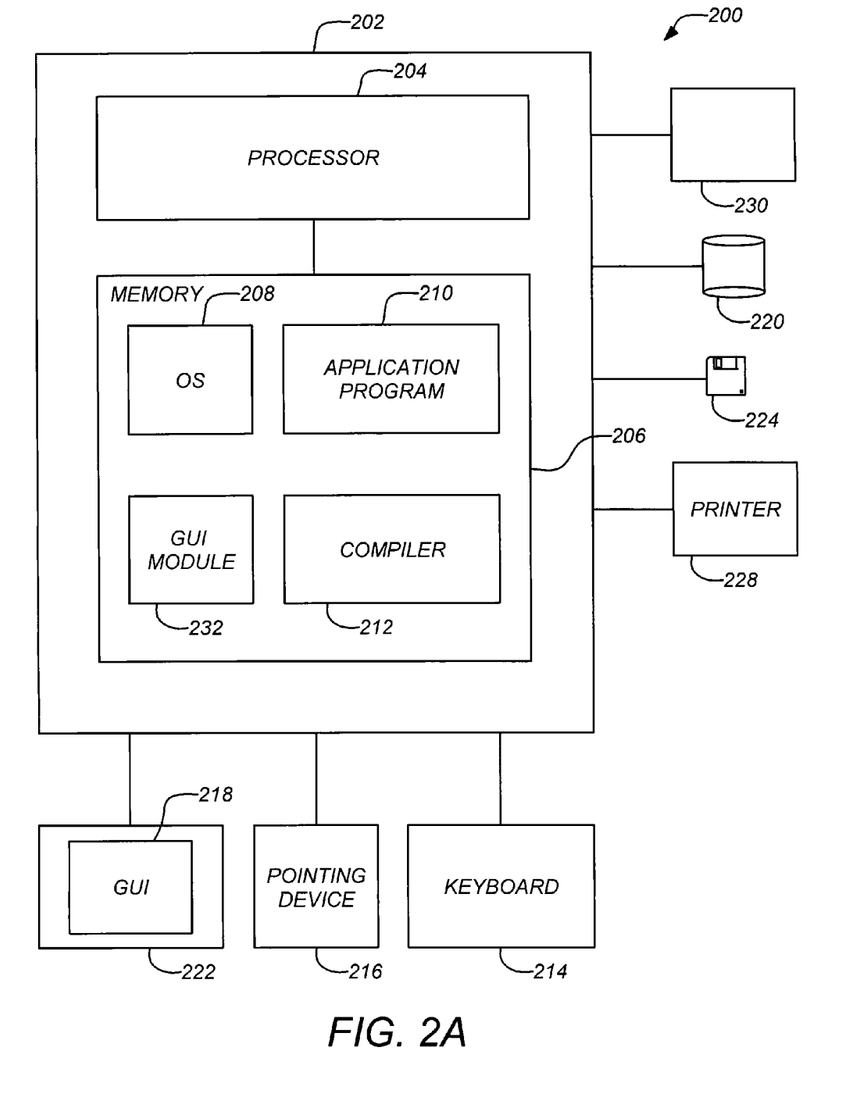
FIG. 2A illustrates an exemplary computer system that can be used to implement embodiments of the present invention.

FIG. 2A illustrates an exemplary computer system 200 that can be used to implement embodiments of the present invention. The computer 202 comprises a processor 204 and a memory 206, such as random access memory (RAM). The computer 202 is operatively coupled to a display 222, which presents images such as windows to the user on a graphical user interface 218. The computer 202 may be coupled to other devices, such as a keyboard 214, a mouse device 216, a printer 228, etc. Of course, those skilled in the art will recognize that any combination of the above components, or any number of different components, peripherals, and other devices, may be used with the computer 202.

Generally, the computer 202 operates under control of an operating system 208 (e.g. z/OS, OS/2, LINUX, UNIX, WINDOWS, MAC OS) stored in the memory 206, and interfaces with the user to accept inputs and commands and to present results, for example through a graphical user interface (GUI) module 232. Although the GUI module 232 is depicted as a separate module, the instructions performing the GUI functions can be resident or distributed in the operating system 208, a computer program 210, or implemented with special purpose memory and processors.

The computer 202 also implements a compiler 212 which allows one or more application programs 210 written in a programming language such as COBOL, PL/1, C, C++, JAVA, ADA, BASIC, VISUAL BASIC or any other programming language to be translated into code that is readable by the processor 204. After completion, the computer program 210 accesses and manipulates data stored in the memory 206 of the computer 202 using the relationships and logic generated using the compiler 212. The computer 202 also optionally comprises an external data communication device 230 such as a modem, satellite link, ethernet card, wireless link or other device for communicating with other computers, e.g. via the Internet or other network.

Instructions implementing the operating system 208, the computer program 210, and the compiler 212 may be tangibly embodied in a computer-readable medium, e.g., data storage device 220, which may include one or more fixed or removable data storage devices, such as a zip drive, floppy disc 224, hard drive, DVD/CD-rom, digital tape, etc., which are generically represented as the floppy disc 224. Further, the operating system 208 and the computer program 210 comprise instructions which, when read and executed by the computer 202, cause the computer 202 to perform the steps necessary to implement and/or use the present invention. Computer program 210 and/or operating system 208 instructions may also be tangibly embodied in the memory 206 and/or transmitted through or accessed by the data communication device 230. As such, the terms "article of manufacture," "program storage device" and "computer program product" as may be used herein are intended to encompass a computer program accessible and/or operable from any computer readable device or media.

Embodiments of the present invention are generally directed to any software application program 210 that manages data objects (i.e. files) such as with a backup system managing backup storage and restore processes over a network. The program 210 may operate within a single computer 202 or as part of a distributed computer system comprising a network of computing devices. The network may encompass one or more computers connected via a local area network and/or Internet connection (which may be public or secure, e.g. through a VPN connection).

Figure 2B:
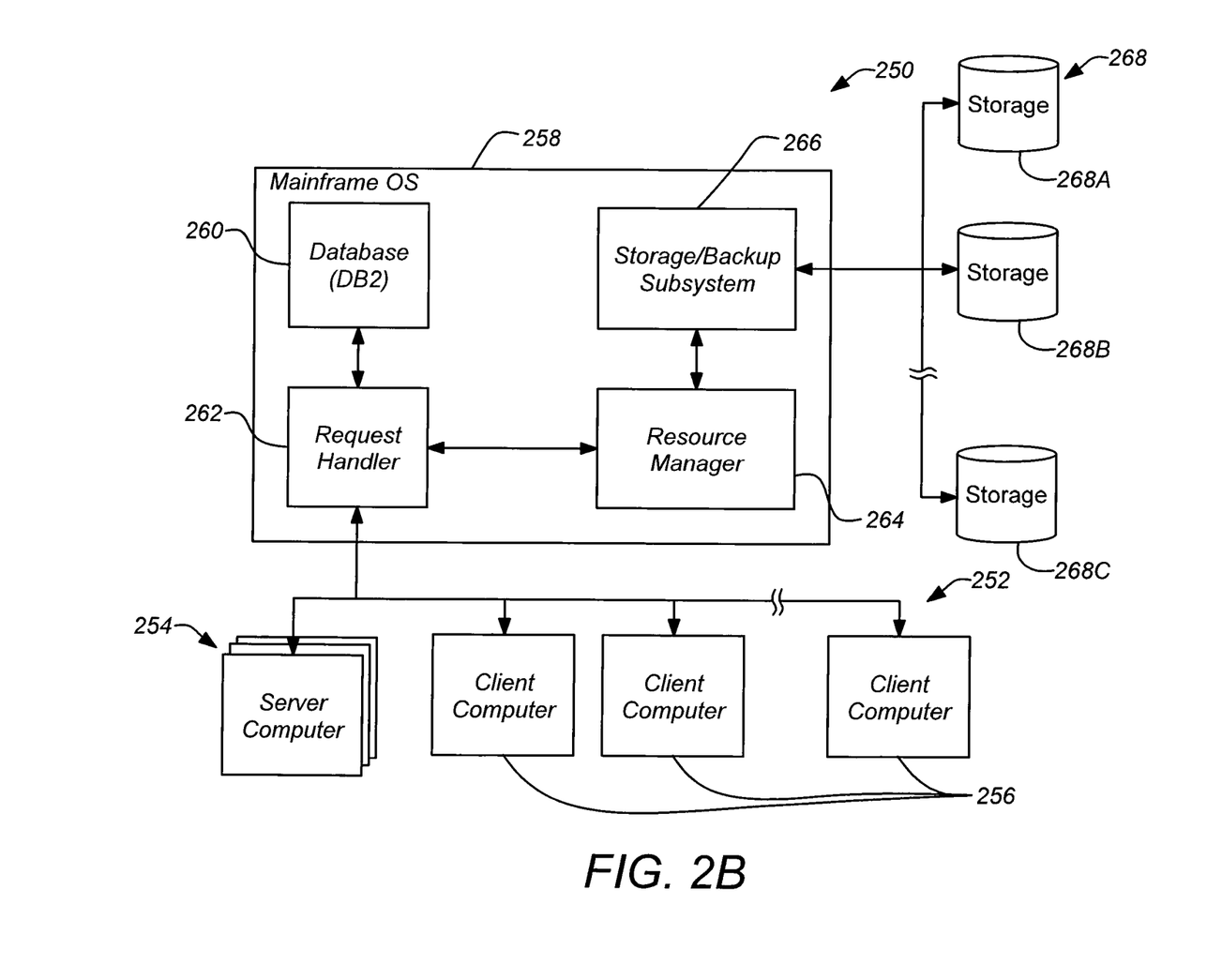
FIG. 2B illustrates a typical distributed computer system which may be employed in an typical embodiment of the invention.

FIG. 2B illustrates a typical distributed computer system 250 which may be employed in an typical embodiment of the invention. Such a system 250 comprises a plurality of computers 202 which are interconnected through respective communication devices 230 in a network 252. The network 252 may be entirely private (such as a local area network within a business facility) or part or all of the network 252 may exist publicly (such as through a virtual private network (VPN) operating on the Internet). Further, one or more of the computers 202 may be specially designed to function as a server or host 254 facilitating a variety of services provided to the remaining client computers 256. In one example, one or more hosts may be a mainframe computer 258 where significant processing for the client computers 256 may be performed. The mainframe computer 258 may comprise a database 260 which is coupled to a request handler 262 which implements a number of database procedures for other networked computers 202 (servers 254 and/or clients 256). The request handler 262 is also coupled to a resource manager 264 which directs data accesses through storage/backup subsystem 266 that facilitates accesses to networked storage devices 268 comprising a SAN. Thus, the storage/backup subsystem 266 on the computer 258 comprises the backup server which manages backup data objects from the client computers 256 stored on networked storage devices 268 in a distributed storage system. The SAN may include devices such as direct access storage devices (DASD) optical storage and/or tape storage indicated as distinct physical storage devices 268A-268C. Various known access methods (e.g. VSAM, BSAM, QSAM) may function as part of the storage/backup subsystem 266.

Those skilled in the art will recognize many modifications may be made to this hardware environment without departing from the scope of the present invention. For example, those skilled in the art will recognize that any combination of the above components, or any number of different components, peripherals, and other devices, may be used with the present invention meeting the functional requirements to support and implement various embodiments of the invention described herein.

3. Securely Deleting Data in a Transactionally Consistent Manner

As previously mentioned, embodiments of the invention enable data security in a file system such as a data backup system by securely deleting data objects within the system in a transactionally consistent manner. This is particularly useful in a distributed system comprised of separate components operating in a coordinated fashion which may be more susceptible to a failure of at least one component at any given time. A preparation transaction is committed which will allow the system to be returned to an initial state if the desired execution transaction (such as a data object insertion, deletion, or move) fails to commit. Thus, if the desired execution transaction involves writing the data object, the preparation transaction is committed before any data of the data object is written. If the desired execution transaction involves deleting or moving the data object, the preparation transaction only logically deletes the data object. (In the case of a move operation, the logical deletion is from the first storage location.) If the desired execution transaction fails (involving writing), secure deletion is used as necessary to eliminate partial copies of the data object that may have been written. Similarly, if the desired execution transaction is successful (involving deleting or moving), secure deletion is used as necessary to eliminate copies of the data object which were desired to be removed. (In the case of a move operation, the secure deletion is used for the data object at the first storage location.) The requirements of the preparation transaction will depend upon the desired execution transaction and the success or failure of committing the execution transaction. A typical embodiment of the invention may be illustrated by three different processes for the data object described hereafter.

Figure 3A:
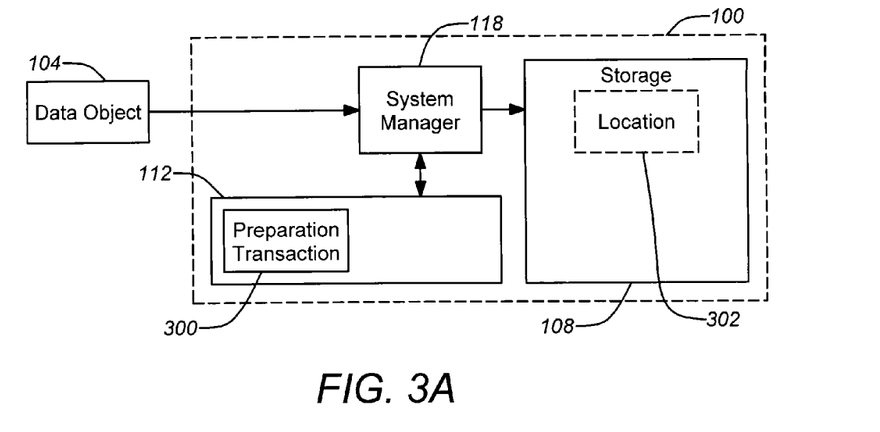
FIG. 3A-3D illustrates insertion of a backup object using secure deletion in a transactionally consistent manner.
Figure 3B:
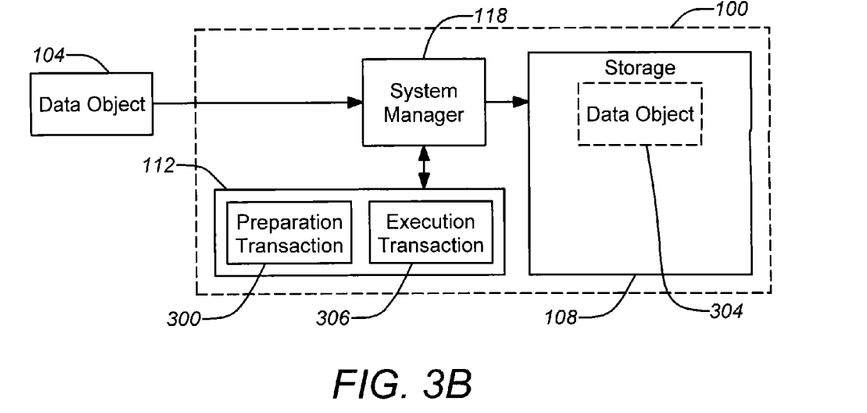
Figure 3C:
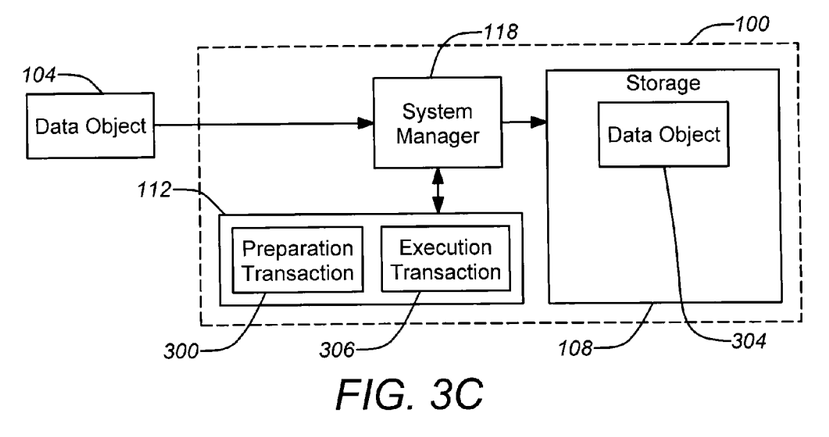
Figure 3D:
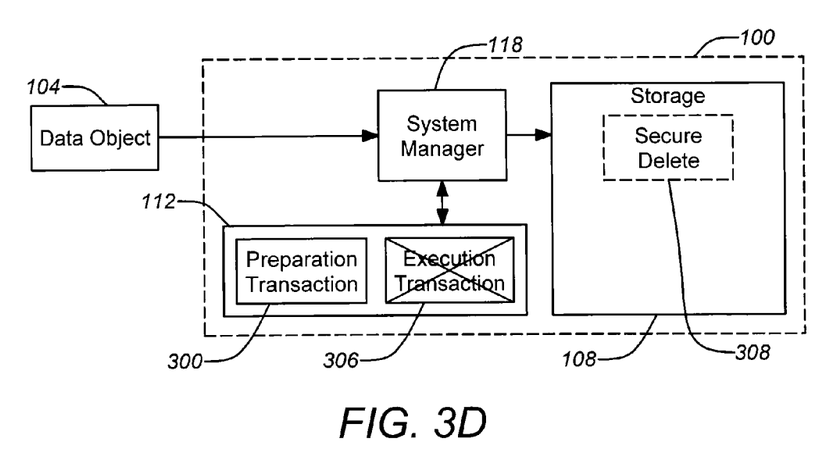

FIG. 3A-3D illustrates securely deleting data in a transactionally consistent manner when a backup object 104 is inserted into the system. FIG. 3A illustrates a first phase where the system manager 118 commits the preparation transaction 300 to the database 112 to include identification of the allocated memory location 302 within the storage 108 and any other necessary parameters. FIG. 3B illustrates the next phase. After successfully committing the preparation transaction 300 in FIG. 3A, the system manager 118 then begins to commit the execution transaction 306 such that the data object 104 is copied (written) to the data object 304 in the storage 108 at the specified location 302. FIG. 3C simply illustrates the outcome of successfully committing the execution transaction 306 where writing of the data object 304 to the storage 108 is complete. FIG. 3D illustrates the consequence of failing to commit the execution transaction 306 (e.g. as a result of a power or other hardware failure) where the contents of the record for the preparation transaction 300 are utilized by the system manager 118 to perform a secure deletion on the memory location 308 which may have at least a portion of the data of the inserted data object 104. The record(s) of the execution transaction 306 within the database 112 may be corrupt as well and should be erased under ordinary housekeeping processes.

Figure 4A:
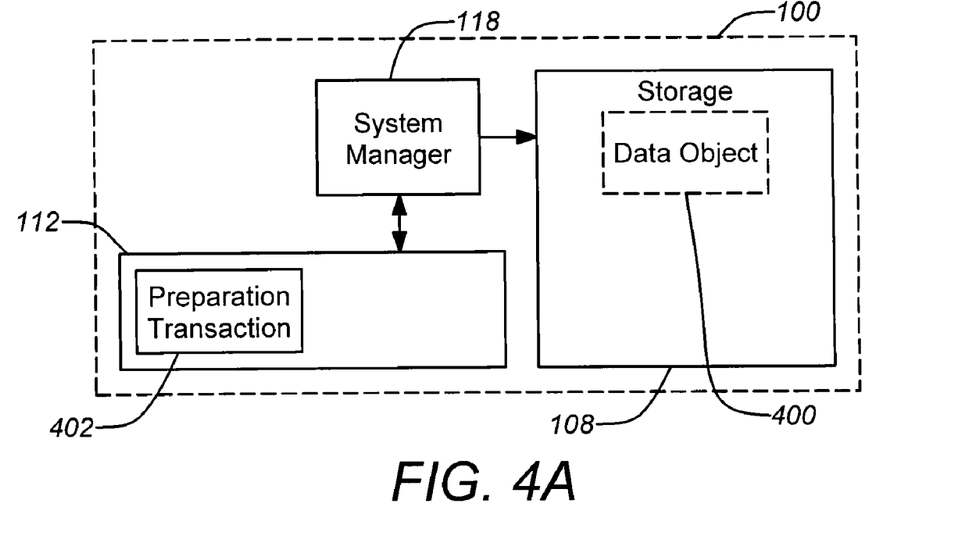
FIG. 4A-4D illustrates secure deletion of a data object from a system in a transactionally consistent manner.
Figure 4B:
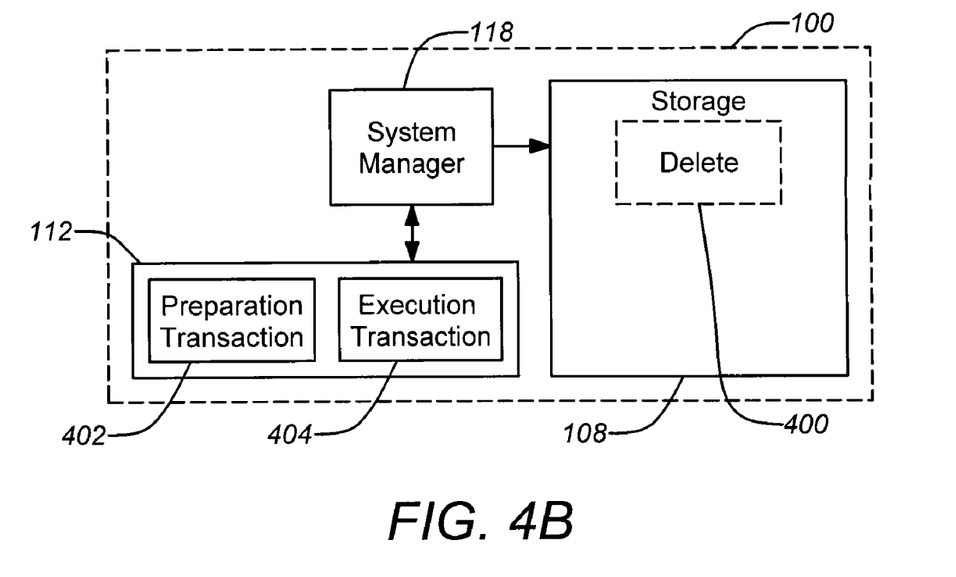
Figure 4C:
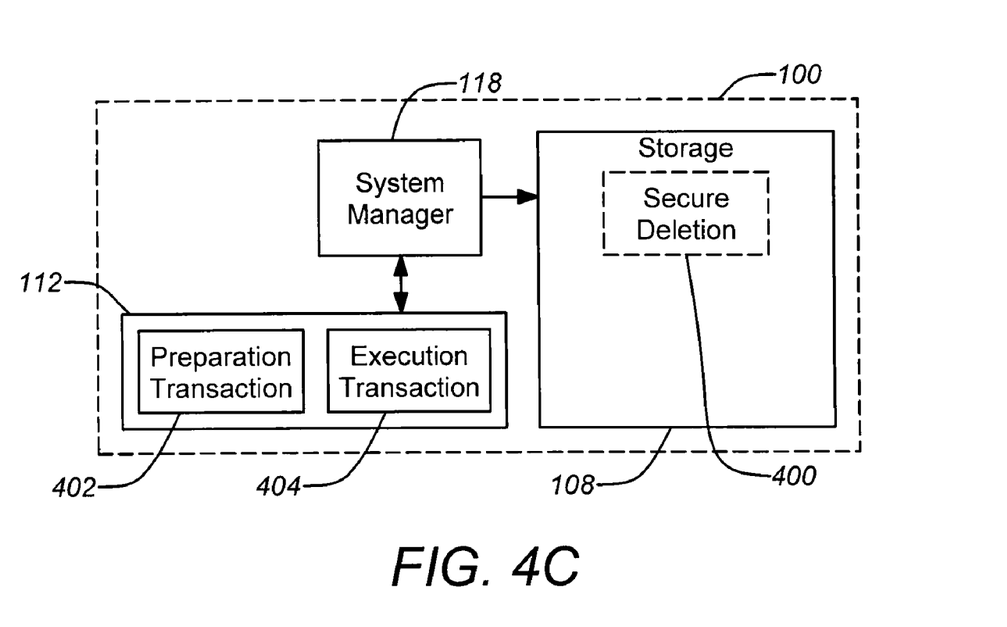
Figure 4D:
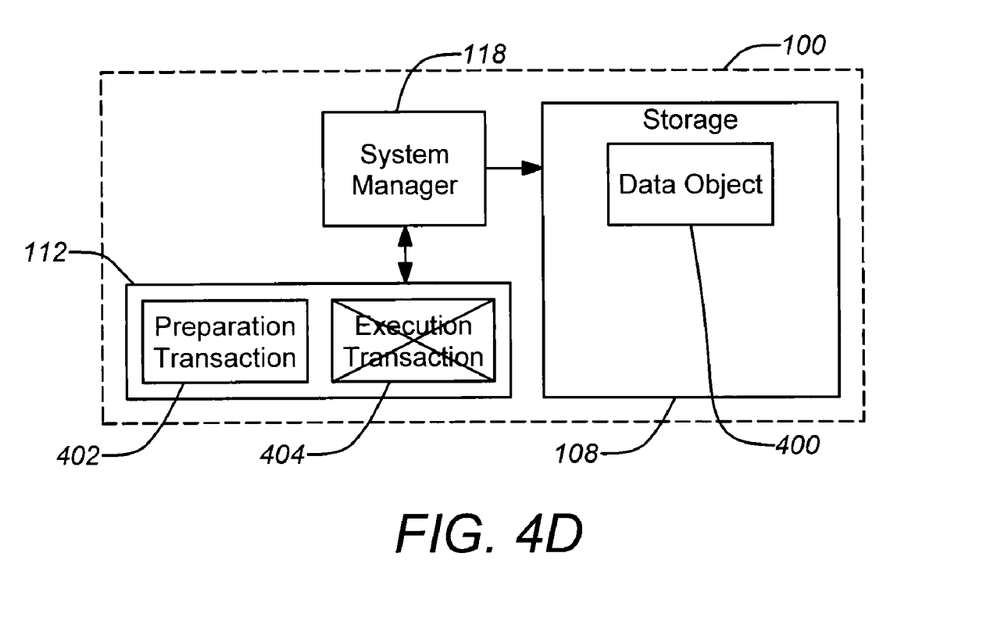

FIG. 4A-4D illustrates secure deletion of a data object from a system 100 in a transactionally consistent manner. In this case, the data object 400 begins at a storage location within the storage 108. FIG. 4A illustrates the preparation transaction 402 is first committed to change the state of the data object to being logically deleted such that it is inaccessible to any users but the underlying data is untouched. FIG. 4B then illustrates that only after the preparation transaction 402 has successfully committed does the system manager 118 begin to commit the execution transaction 404 of deleting the data object 400 from the system 100 such that all functional references to the data object (except in the preparation transaction) within the database 112 are purged. FIG. 4C next illustrates the outcome of successfully committing the execution transaction 404 of deleting the data object 400 from the system 100. Only after this may the storage location of the data object 400 be securely deleted and the records of the preparation transaction 402 may be deleted so that the storage location may be reallocated by the system. On the other hand, FIG. 4D illustrates the result if the execution transaction 404 fails to commit where the record of the preparation transaction 402 including the location of the data object 400 is used to change the state of the data object 400 back from being logically deleted to return the system to an initial condition.

Figure 5A:
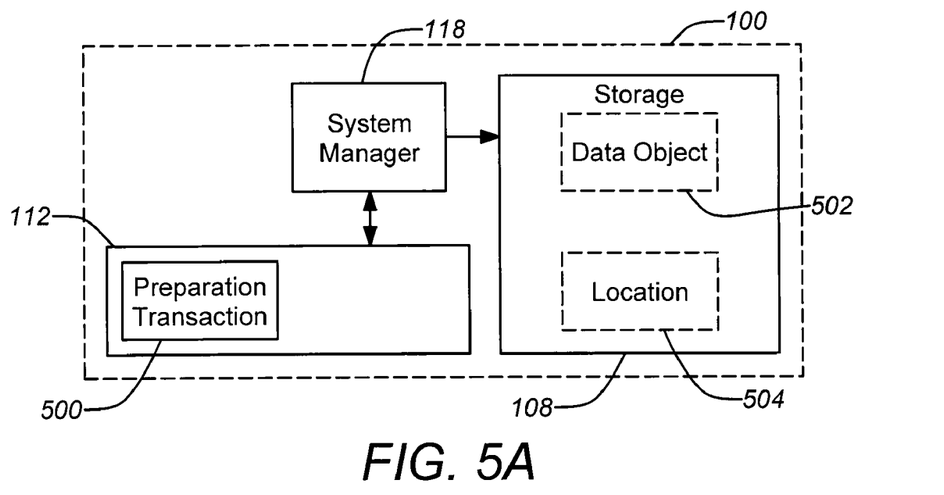
FIG. 5A-5D illustrates moving a data object within a system using secure deletion in a transactionally consistent manner.
Figure 5B:
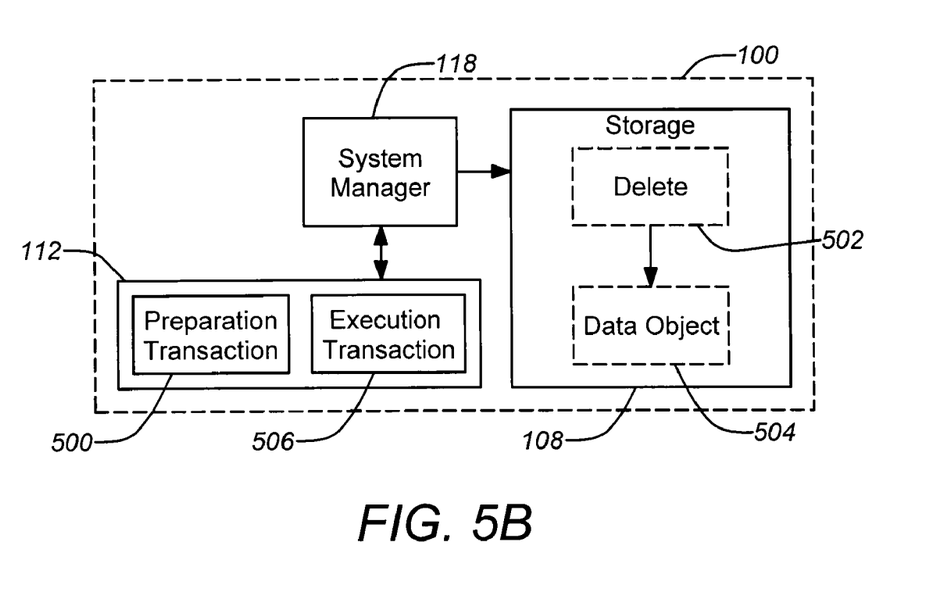
Figure 5C:
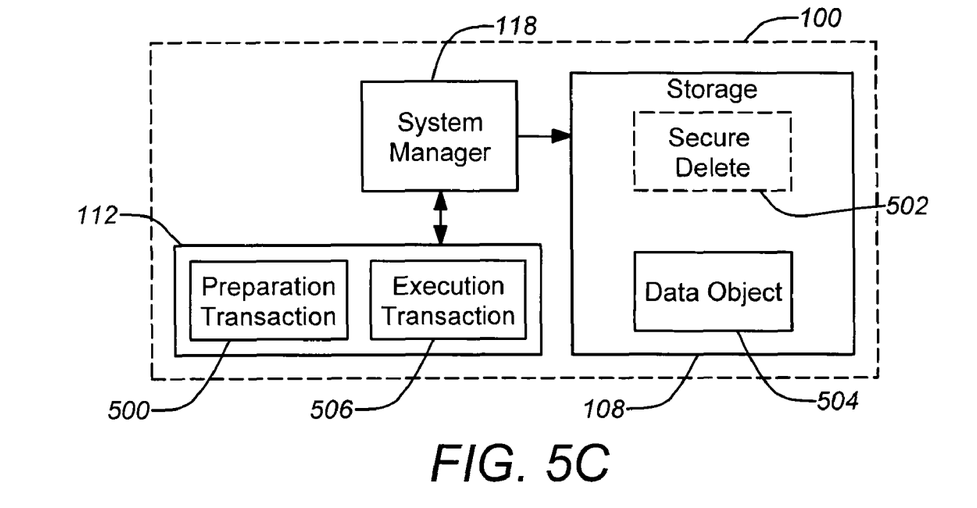
Figure 5D:
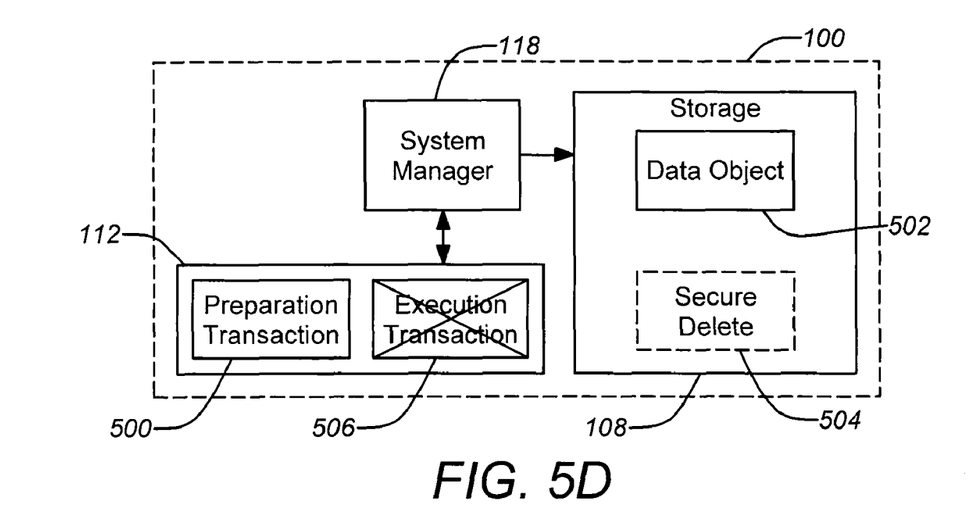

FIG. 5A-5D illustrates moving a data object within a system 100 using secure deletion in a transactionally consistent manner. As previously mentioned, this process essentially combines the insertion and deletion processes described above. FIG. 5A illustrates that the preparation transaction 500 is committed changing the state of a data object 502 at a first location in the storage 108 to being logically deleted. In addition, a second storage location 504 in the storage 108 is allocated for a copy of the original data object 502. As shown in FIG. 5B, only after successfully committing the preparation transaction 500 does the system manager 118 begin to commit the execution transaction 506 to write a copy of the data object 502 at the second location 504 and (after successfully writing it) to delete the original data object 502 at the first location from the system 100. Deletion of the data object 502 from the system 100 entails deleting all references in the database 112 (except those of the preparation transaction 500). FIG. 5C illustrates the result of successfully committing the execution transaction 506 of moving the data object 502 from the first location to the second in the storage 108. Only after successfully committing the execution transaction 506 may the first storage location of the data object 502 be securely deleted and the records of the preparation transaction 500 may be deleted. The first storage location is now made available for reallocation by the system. FIG. 5D illustrates the result if the execution transaction 500 fails to commit. Here, the record of the preparation transaction 500 including the first location of the data object 502 is used to change the state of the data object 502 back from being logically deleted to return the system 100 to an initial condition. In addition, any portion of the data object 502 that may have been written to the second location 504 is now securely deleted.

Figure 6:
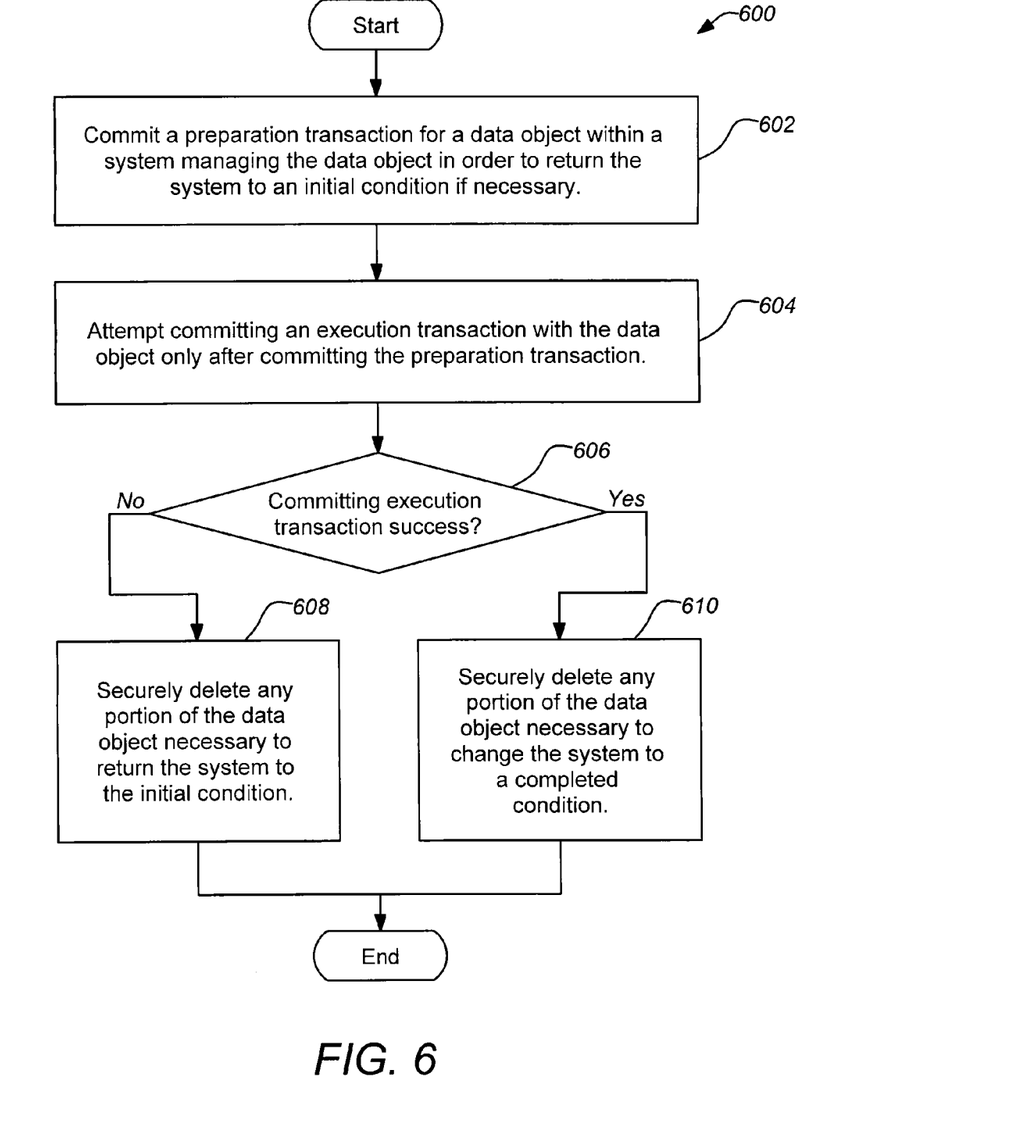
FIG. 6 is a flowchart of an exemplary method manipulating a data object in a system using secure deletion in a transactionally consistent manner.

FIG. 6 is a flowchart of an exemplary method 600 of the invention. In operation 602, a preparation transaction is first committed for a data object within a system managing the data object in order to return the system to an initial condition if necessary. In operation 604, an attempt is made to successfully complete an execution transaction with the data object only after committing the preparation transaction. What happens after operation 604 will depend on whether the execution transaction succeeds (is committed) or fails (is aborted) as indicated by decision block 606. If the execution transaction fails, in operation 608 any portion of the data object that was written will be securely deleted as necessary to return the system to the initial condition. On the other hand, if the execution transaction was successfully committed, in operation 610 any portion of the data object that should be deleted will be securely deleted as necessary to change the system to a completed condition. Exactly what (if anything) is securely deleted will depend upon whether the execution transaction was successful or not as well as the type of execution transaction involved as described hereafter.

In the case of a failed execution transaction for an insertion operation under operation 608, secure deletion is performed in order to return the system to the initial condition by securely deleting any portion of the data object that may have been written to the storage location. In the case of a successful execution transaction for a deletion operation under operation 610, secure deletion is performed to change the system to a completed condition by securely deleting the storage location of the deleted data object. The execution transaction for a move operation is essentially a combination of a deletion at a first memory location coordinated with an insertion to a second memory location. Accordingly, a failed execution transaction for a move operation results in secure deletion performed in order to return the system to the initial condition by securely deleting any portion of the data object that may have been written to the second location under operation 608. A successful execution transaction for a move operation results in secure deletion performed in order to change the system to the completed condition by securely deleting the data object at the first location.

It should also be noted that there are some instances where secure deletion is not invoked as will be understood by those skilled in the art. For example, the simple cases of either a successful execution transaction for an insertion or a failed execution transaction for a deletion will not require secure deletion to preserve data security. Secure deletion may be performed only as necessary to maintain data security. In a similar manner, the actual process of secure deletion may be used only as necessary even when it is invoked at a specified storage location; the secure deletion process may monitor the data that is being securely deleted and suspend the process at a point where all the data of concern has been securely deleted. This may occur, for example, in cases where writing a data object fails after only writing a portion of the data object. Only the portion that was written requires secure deletion and there is no need to continue secure deletion over the entire designated storage location.

The contents of the preparation transaction will depend upon the desired objective of the execution transactions to be performed, data object insertion, deletion or moving. In the case of inserting a data object, the preparation transaction may comprise allocating a storage location for the data object and the execution transaction comprises writing the data object into the storage location to insert the data object into the system. Returning the system to the initial system comprises securely deleting any portion of the data object written to the storage location and changing the system to a completed state comprises successfully writing the data object to the storage location.

In the basic case of deleting a data object already existing at a storage location in the system, the preparation transaction comprises assigning a logically deleted state to the data object and the execution transaction comprises deleting the data object in the system. Returning the system to the initial state comprises removing the logically deleted state from the data object at the storage location to make the data object accessible and changing the system to a completed state comprises successfully securely deleting the data object at the storage location.

The case of moving a data object combines insertion and deletion processes. Here, the preparation transaction comprises assigning a logically deleted state to the data object existing at a first storage location in the system and allocating a second storage location in the system for the data object. The execution transaction comprises copying the data object from the first storage location to the second storage location and deleting the data object at the first storage location. Returning the system to the initial state comprises removing the logically deleted state from the data object at the first storage location to make the data object accessible and securely deleting any portion of the data object written to the second storage location. Changing the system to a completed state comprises successfully writing the data object to the second storage location during the execution transaction followed by successfully securely deleting the data object at the first storage location.

This concludes the description including the preferred embodiments of the present invention. The foregoing description including the preferred embodiment of the invention has been presented for the purposes of illustration and description. It is not intended to be exhaustive or to limit the invention to the precise forms disclosed. Many modifications and variations are possible within the scope of the foregoing teachings. Additional variations of the present invention may be devised without departing from the inventive concept as set forth in the following claims.

What is claimed is:

1. A computer program embodied on a non-transitory computer readable storage medium, comprising:

computer readable program code configured for execution on a processor, wherein upon execution of the computer readable program code causes the processor to perform:

program instruction for identifying and allocating a new storage location for a data object within a system managing the data object in an original location;

program instruction for committing a preparation transaction for the data object within the system in order to return the system to an initial condition if necessary, the committing of the preparation transaction comprises putting the new storage location into a write state and it depends upon the desired objective of the execution transactions to be performed, data object insertion, deletion or moving and assigning a logically deleted state to the data object in the original location such that the data object is inaccessible to any users but the underlying data is untouched, wherein no portion of the data object is written to the new storage location by the preparation transaction;

program instruction for committing an execution transaction with the data object only after committing the preparation transaction; and program instruction for securely deleting from the new storage location any portion of the data object necessary to return the system to the initial condition if committing the execution transaction fails and reallocating the new storage location and securely deleting any portion of the data object from the original location to change the system to a completed condition only if committing the execution transaction succeeds and the original storage location is made available for reallocation by the system;

wherein the secure deletion process monitor the data that is being securely deleted and suspend the process at a point where all the data of concern has been securely deleted and the change of state is performed in the delete or move transaction, such that if the transaction commits, the object is logically deleted, if the transaction fails, the data will still be accessible; and wherein the system is managed with the preparation transaction and the execution transaction committed to a database comprising one or more records associated with the data object including one or more storage locations for the data object, the one or more records associated with the data object include a state for the data object, and securely deleting any portion of the data object comprises positively removing data from a specified physical location such that it is not recoverable by known means.

2. The computer program of claim 1, wherein the execution transaction comprises writing the data object into the new storage location to insert the data object into the system; and wherein returning the system to the initial condition comprises securely deleting any portion of the data object written to the new storage location and changing the system to a completed condition comprises successfully writing the data object to the new storage location.

3. The computer program of claim 1, wherein the data object exists at the new storage location in the system and the execution transaction comprises deleting the data object in the system; and wherein returning the system to the initial condition comprises removing the logically deleted state from the data object at the new storage location to make the data object accessible and changing the system to the completed condition comprises successfully securely deleting the data object at the new storage location.

4. The computer program of claim 1, wherein the data object exists at a first storage location in the system and allocating a second storage location in the system for the data object and the execution transaction comprises deleting the data object at the first storage location in the system and writing the data object to the second storage location in the system; and wherein returning the system to the initial condition comprises removing the logically deleted state from the data object at the first storage location to make the data object accessible and securely deleting any portion of the data object written to the second storage location and changing the system to the completed condition comprises successfully securely deleting the data object at the first storage location and successfully writing the data object to the second storage location.

5. A method, comprising the steps of:

identifying by a processor, and allocating a new storage location for a data object within a system managing the data object in an original location;

committing a preparation transaction for the data object within the system in order to return the system to an initial condition if necessary, the committing of the preparation transaction comprises putting the new storage location into a write state and it depends upon the desired objective of the execution transactions to be performed, data object insertion, deletion or moving and assigning a logically deleted state to the data object in the original location such that the data object is inaccessible to any users but the underlying data is untouched, wherein no portion of the data object is written to the new storage location by the preparation transaction;

attempting to commit an execution transaction with the data object only after committing the preparation transaction; and securely deleting from the new storage location any portion of the data object necessary to return the system to the initial condition if committing the execution transaction fails and reallocating the new storage location and securely deleting any portion of the data object from the original location to change the system to a completed condition only if committing the execution transaction succeeds and the original storage location is made available for reallocation by the system;

wherein the secure deletion process monitor the data that is being securely deleted and suspend the process at a point where all the data of concern has been securely deleted and the change of state is performed in the delete or move transaction, such that if the transaction commits, the object is logically deleted, if the transaction fails, the data will still be accessible; and wherein the system is managed with the preparation transaction and the execution transaction committed to a database comprising one or more records associated with the data object including one or more storage locations for the data object, the one or more records associated with the data object include a state for the data object, and securely deleting any portion of the data object comprises positively removing data from a specified physical location such that it is not recoverable by known means.

6. The method of claim 5, wherein the execution transaction comprises writing the data object into the new storage location to insert the data object into the system; and wherein returning the system to the initial condition comprises securely deleting any portion of the data object written to the new storage location and changing the system to a completed condition comprises successfully writing the data object to the new storage location.

7. The method of claim 5, wherein the data object exists at the new storage location in the system and the execution transaction comprises deleting the data object in the system; and wherein returning the system to the initial condition comprises removing the logically deleted state from the data object at the new storage location to make the data object accessible and changing the system to the completed condition comprises successfully securely deleting the data object at the new storage location.

8. The method of claim 5, wherein the data object exists at a first storage location in the system and allocating a second storage location in the system for the data object and the execution transaction comprises deleting the data object at the first storage location in the system and writing the data object to the second storage location in the system; and wherein returning the system to the initial condition comprises removing the logically deleted state from the data object at the first storage location to make the data object accessible and securely deleting any portion of the data object written to the second storage location and changing the system to the completed condition comprises successfully securely deleting the data object at the first storage location and successfully writing the data object to the second storage location.

9. A system, comprising:

a processor;

a data storage for identifying and allocating a new storage location for a data object within a system managing the data object in an original location;

a system manager managing storage of the data object from the client by committing a preparation transaction for the data object in order to return the system to an initial condition if necessary, and the preparation transaction comprises putting the new storage location into a write state and it depends upon the desired objective of the execution transactions to be performed, data object insertion, deletion or moving and assigning a logically deleted state to the data object in the original location such that the data object is inaccessible to any users but the underlying data is untouched, wherein no portion of the data object is written to the new storage location by the preparation transaction, attempting to commit an execution transaction with the data object only after committing the preparation transaction and securely deleting from the new storage location any portion of the data object necessary to return the system to the initial condition if committing the execution transaction fails and reallocating the new storage location and securely deleting any portion of the data object from the original location to change the system to a completed condition only if committing the execution transaction succeeds, and the original storage location is made available for reallocation by the system;

wherein the secure deletion process monitor the data that is being securely deleted and suspend the process at a point where all the data of concern has been securely deleted and the change of state is performed in the delete or move transaction, such that if the transaction commits, the object is logically deleted, if the transaction fails, the data will still be accessible; and wherein the system condition is managed with the preparation transaction and the execution transaction committed to a database comprising one or more records associated with the data object including one or more storage locations for the data object, the one or more records associated with the data object include a state for the data object, and securely deleting any portion of the data object comprises positively removing data from a specified physical location such that it is not recoverable by known means.

10. The system of claim 9, wherein the system comprises a data backup system, the data object comprises a backup object stored, and the data storage comprises a backup repository.

11. The system of claim 9, wherein the system operates over distributed computer system of networked devices.

12. The system of claim 9, wherein the system comprises a distributed data backup system operating over a distributed computer system of networked devices, the data object comprises a backup object, and the data storage comprises a backup repository of the distributed data backup system.

* * * * *